US012757128B2

(12) United States Patent
Sen et al.

(10) Patent No.: US 12,757,128 B2
(45) Date of Patent: Oct. 6, 2026

(54) POWER CONTROL FOR NON-UNIFORM MESSAGE TRANSMISSIONS

(71) Applicant: QUALCOMM Incorporated, San Diego, CA (US)

(72) Inventors: Pinar Sen, San Diego, CA (US); Wei Yang, San Diego, CA (US); Jing Jiang, San Diego, CA (US); Naga Bhushan, San Diego, CA (US); June Namgoong, San Diego, CA (US); Akash Sandeep Doshi, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 18/640,863

(22) Filed: Apr. 19, 2024

(65) Prior Publication Data

US 2025/0330918 A1 Oct. 23, 2025

(51) Int. Cl.
*H04W 52/36* (2009.01)
*H04L 1/1812* (2023.01)
*H04W 52/54* (2009.01)

(52) U.S. Cl.
CPC ........... *H04W 52/36* (2013.01); *H04L 1/1812* (2013.01); *H04W 52/54* (2013.01)

(58) Field of Classification Search
CPC ... H04W 52/36; H04W 52/54; H04W 52/146; H04W 52/346; H04W 52/225; H04W 52/362; H04W 52/16; H04W 52/18; H04W 52/06; H04W 52/262; H04W 52/58; H04W 88/02; H04W 52/223; H04L 1/1812; H04L 1/0001; H04L 1/0077; H04L 1/1867; H04L 5/0055; H04L 1/0059; H04B 7/0456
See application file for complete search history.

(56) References Cited

U.S. PATENT DOCUMENTS

| | | | | |
|---|---|---|---|---|
| 8,755,832 | B2 * | 6/2014 | Baldemair | H04W 52/54 455/67.11 |
| 2022/0015039 | A1 * | 1/2022 | Huang | H04W 52/146 |
| 2023/0171711 | A1 * | 6/2023 | Abotabl | H04W 52/146 455/522 |
| 2025/0047353 | A1 * | 2/2025 | Sun | H04L 1/18 |
| 2025/0132857 | A1 * | 4/2025 | Golitschek | H04L 1/1812 |

FOREIGN PATENT DOCUMENTS

| | | |
|---|---|---|
| EP | 0806091 B1 | 3/2007 |
| WO | WO-0011845 A1 | 3/2000 |

OTHER PUBLICATIONS

International Search Report and Written Opinion—PCT/US2025/020784—ISA/EPO—Jun. 23, 2025.

* cited by examiner

*Primary Examiner* — Lana N Le
(74) *Attorney, Agent, or Firm* — Holland & Hart LLP

(57) ABSTRACT

Methods, systems, and devices for wireless communications are described. Techniques described herein provide power control for non-uniform message transmissions. In some examples, a user equipment (UE) may receive control signaling indicating a power control parameter. The power control parameter may be associated with a non-uniform probability of a message, and the non-uniform probability may be associated with a probability of bit values present in the message. The UE may perform a power scaling of a codeword based on the power control parameter, where the codeword includes the message. The UE may transmit the codeword based on the power scaling.

20 Claims, 9 Drawing Sheets

POWER CONTROL FOR NON-UNIFORM MESSAGE TRANSMISSIONS

TECHNICAL FIELD

The following relates to wireless communications, including power control for non-uniform message transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support power control for non-uniform message transmissions. For example, the described techniques provide for assigning relatively more power to less likely messages and relatively less power to more likely messages to save transmission power (e.g., reduce an average transmission power). In some examples, a user equipment (UE) may receive control signaling indicating a power control parameter. The power control parameter may be associated with a non-uniform probability of a message, and the non-uniform probability may be associated with a probability of bit values present in the message. The UE may perform a power scaling of a codeword based on the power control parameter, and the codeword comprises the message. The UE may transmit the codeword based on the power scaling.

A method for wireless communications by a UE is described. The method may include receiving a first control signal indicating a power control parameter that is associated with a non-uniform probability of a message, where the non-uniform probability is associated with a probability of one or more bit values included in the message, performing a power scaling procedure for a codeword based on the power control parameter, where the codeword includes the message, and transmitting the codeword based on the power scaling procedure.

A UE for wireless communications is described. The UE may include one or more memories storing processor executable code, and one or more processors coupled with the one or more memories (e.g., operatively, communicatively, functionally, electronically, or electrically). The one or more processors may individually or collectively be operable to execute the code (e.g., directly, indirectly, after pre-processing, without pre-processing) to cause the UE to receive a first control signal indicating a power control parameter that is associated with a non-uniform probability of a message, where the non-uniform probability is associated with a probability of one or more bit values included in the message, perform a power scaling procedure for a codeword based on the power control parameter, where the codeword includes the message, and transmit the codeword based on the power scaling procedure.

Another UE for wireless communications is described. The UE may include means for receiving a first control signal indicating a power control parameter that is associated with a non-uniform probability of a message, where the non-uniform probability is associated with a probability of one or more bit values included in the message, means for performing a power scaling procedure for a codeword based on the power control parameter, where the codeword includes the message, and means for transmitting the codeword based on the power scaling procedure.

A non-transitory computer-readable medium storing code for wireless communications is described. The code may include instructions executable by one or more processors (e.g., directly, indirectly, after pre-processing, without pre-processing) to receive a first control signal indicating a power control parameter that is associated with a non-uniform probability of a message, where the non-uniform probability is associated with a probability of one or more bit values included in the message, perform a power scaling procedure for a codeword based on the power control parameter, where the codeword includes the message, and transmit the codeword based on the power scaling procedure.

In some examples of the method, UEs, and non-transitory computer-readable medium described herein, transmitting the codeword may include operations, features, means, or instructions for applying normalization to the codeword after the power scaling procedure, where the normalization may be based on a power value associated with a codebook and transmitting the codeword based on the normalization.

In some examples of the method, UEs, and non-transitory computer-readable medium described herein, the normalization may be applied to each symbol associated with the codeword or to a block length associated with the codeword.

In some examples of the method, UEs, and non-transitory computer-readable medium described herein, performing the power scaling procedure for the codeword may include operations, features, means, or instructions for performing the power scaling procedure for the codeword based on a power threshold, where a power associated with the codeword may be limited based on the power threshold.

Some examples of the method, UEs, and non-transitory computer-readable medium described herein may further include operations, features, means, or instructions for receiving a second control signal indicating the power threshold.

Some examples of the method, UEs, and non-transitory computer-readable medium described herein may further include operations, features, means, or instructions for determining the power threshold based on the one or more bit values included in the message and transmitting a signal indicating the power threshold.

In some examples of the method, UEs, and non-transitory computer-readable medium described herein, the message includes a sequence of one or more hybrid-automatic repeat request (HARQ) acknowledgment (ACK) bit values or one or more hybrid automatic repeat request (HARQ) negative acknowledgment (NACK) bit values and the power control parameter may be associated with the non-uniform probability of the message including the one or more HARQ acknowledgment (ACK) bit values or the one or more HARQ negative acknowledgment (NACK) bit values.

In some examples of the method, UEs, and non-transitory computer-readable medium described herein, transmitting the codeword may include operations, features, means, or instructions for applying, after the power scaling procedure, normalization to the codeword, where the normalization may be based on a normalization parameter, where the normalization parameter may be associated with an entropy of a distribution of the one or more bit values included in the message, where the power control parameter may be associated with the non-uniform probability of the message including independent and identically distributed bit values and transmitting the codeword based on the normalization.

In some examples of the method, UEs, and non-transitory computer-readable medium described herein, transmitting the codeword may include operations, features, means, or instructions for applying, after the power scaling procedure, normalization to the codeword, where the normalization may be based on a normalization parameter, where the normalization parameter may be associated with an entropy of a distribution of the one or more bit values included in the message, where the power control parameter may be associated with the non-uniform probability of the message including non-identically distributed bit values.

In some examples of the method, UEs, and non-transitory computer-readable medium described herein, the one or more bit values correspond to one or more types of content of the message.

In some examples of the method, UEs, and non-transitory computer-readable medium described herein, the non-uniform probability corresponds to one or more reliability parameters for the message.

In some examples of the method, UEs, and non-transitory computer-readable medium described herein, bit values associated with a first portion of the message may have a non-uniform probability and bit values associated with a second portion of the message may have a uniform probability.

In some examples of the method, UEs, and non-transitory computer-readable medium described herein, the power scaling procedure may be based on one or more capabilities of the UE.

In some examples of the method, UEs, and non-transitory computer-readable medium described herein, transmitting the codeword may include operations, features, means, or instructions for applying normalization to the codeword after the power scaling procedure, where the normalization may be based on a power value associated with a codebook, computing a mean of an amplitude associated with a transmitted signal, and transmitting the codeword based on the normalization and the mean.

In some examples of the method, UEs, and non-transitory computer-readable medium described herein, the mean may be computed for each symbol associated with the codeword or over a block length associated with the codeword.

In some examples of the method, UEs, and non-transitory computer-readable medium described herein, the power scaling procedure may be based on a scaling parameter of $\log(1/p(x))$, where $p(x)$ may be the probability of the one or more bit values included in the message.

DETAILED DESCRIPTION

A user equipment (UE) may receive downlink signaling from a network entity, and the UE may transmit feedback messages for the downlink signaling. For example, the UE may transmit a feedback codebook (e.g., a sequence of bits that indicate feedback for one or multiple downlink transmissions), such as a hybrid-automatic repeat request (HARQ) acknowledgment (ACK) or negative acknowledgment (NACK) codebook including feedback bits indicating ACK or NACK information for the received downlink signaling. In some examples, the UE may be more likely to transmit the ACK (e.g., bit 0) than the NACK (e.g., bit 1). For example, at a 10% block-error rate (BLER) in physical downlink shared channel (PDSCH), the UE may transmit 90% ACK and 10% NACK. However, current codebooks are designed for uniform probability of messages with equal likelihood of the bit 0 and bit 1, and power is applied uniformly to the non-uniform message.

Techniques for power control for non-uniform message transmission may improve power savings. More power may be applied to less likely messages and less power may be applied to more likely messages to save an average transmit power. In some examples, the UE may receive control signaling indicating a power control parameter. The power control parameter may be associated with a non-uniform probability of a message, and the non-uniform probability may be associated with a probability of bit values present in the message. The UE may perform a power scaling of a codeword based on the power control parameter, where the codeword includes the message. The UE may transmit the codeword based on the power scaling. In some cases, the message may be a sequence of HARQ ACK bit values and HARQ NACK bit values, and the power control parameter may indicate the non-uniform probability of a prior message comprising the HARQ ACK bit values and the HARQ NACK bit values.

Aspects of the disclosure are initially described in the context of wireless communications systems. Aspects of the disclosure are also described in context of a process flow. Aspects of the disclosure are further illustrated by and described with reference to apparatus diagrams, system diagrams, and flowcharts that relate to power control for non-uniform message transmissions.

Figure 1:
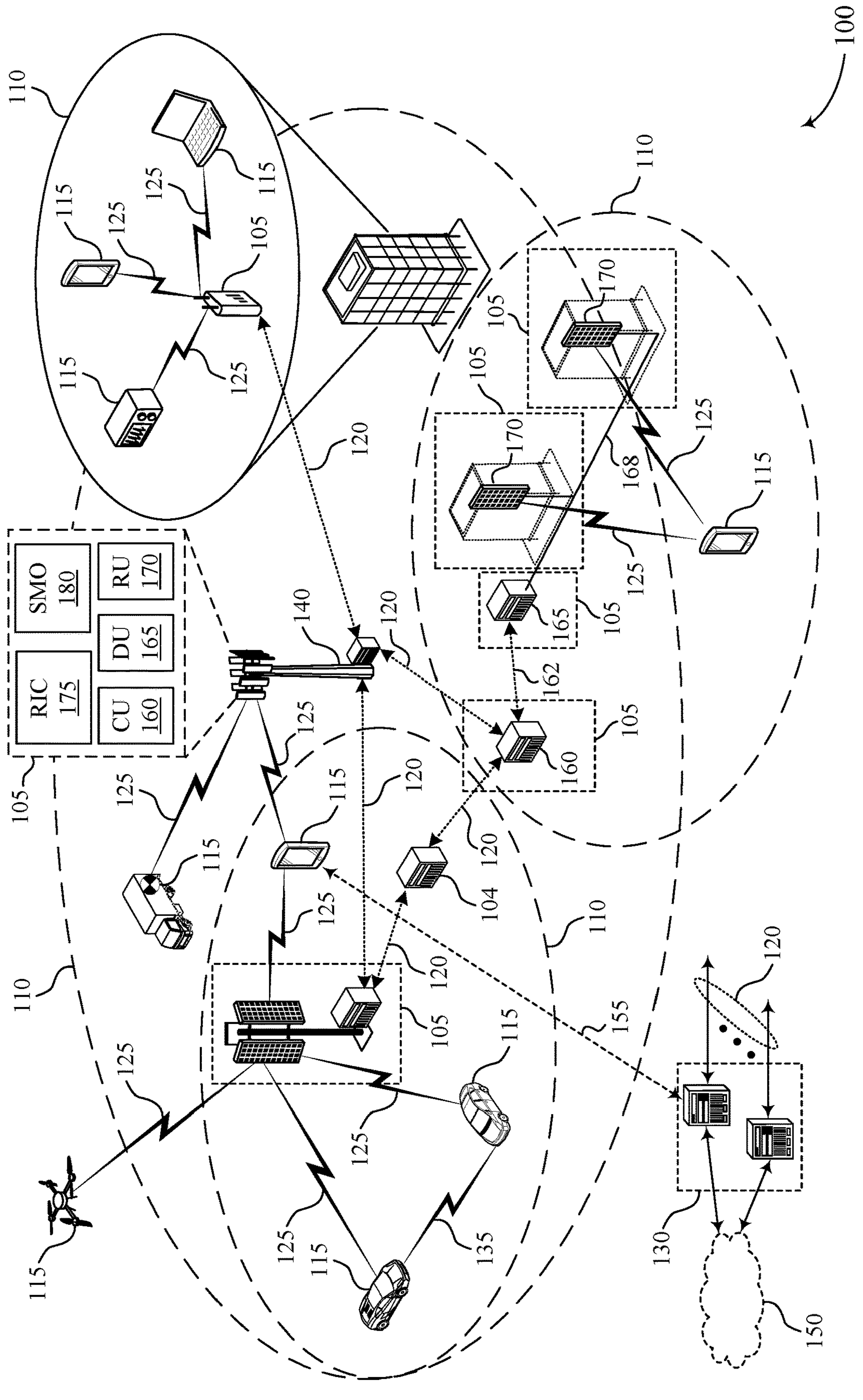
FIG. 1 shows an example of a wireless communications system that supports power control for non-uniform message transmissions in accordance with one or more aspects of the present disclosure.

FIG. 1 shows an example of a wireless communications system 100 that supports power control for non-uniform message transmissions in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, an MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The UE 115 may receive downlink signaling from the network entity 105, and the UE 115 may transmit feedback messages for the downlink signaling. For example, the UE 115 may transmit a feedback codebook, such as a HARQ ACK or NACK codebook (e.g., a sequence of bit values) including feedback bits indicating ACK or NACK information for the received downlink signaling. In some examples, the UE 115 may be more likely to transmit the ACK (e.g., bit 0) than the NACK (e.g., bit 1). For example, at a 10% BLER in PDSCH, the UE 115 may transmit 90% ACK and 10% NACK. However, conventional codebooks are designed for uniform probability of messages with equal likelihood of the bit 0 and bit 1, and power is applied uniformly to the non-uniform message.

Techniques for power control for non-uniform message transmission may improve power savings. More power may be applied to less likely messages and less power may be applied to more likely messages to save average transmit power. In some examples, the UE 115 may receive control signaling indicating a power control parameter. The power control parameter may be associated with a non-uniform probability of a message, and the non-uniform probability may be associated with a probability of bit values present in the message. The UE 115 may perform a power scaling of a codeword based on the power control parameter, where the codeword includes the message. The UE 115 may transmit the codeword based on the power scaling. In some cases, the message may be a sequence of HARQ ACK bit values and HARQ NACK bit values, and the power control parameter may indicate the non-uniform probability of a prior message comprising the HARQ ACK bit values and the HARQ NACK bit values.

Figure 2:
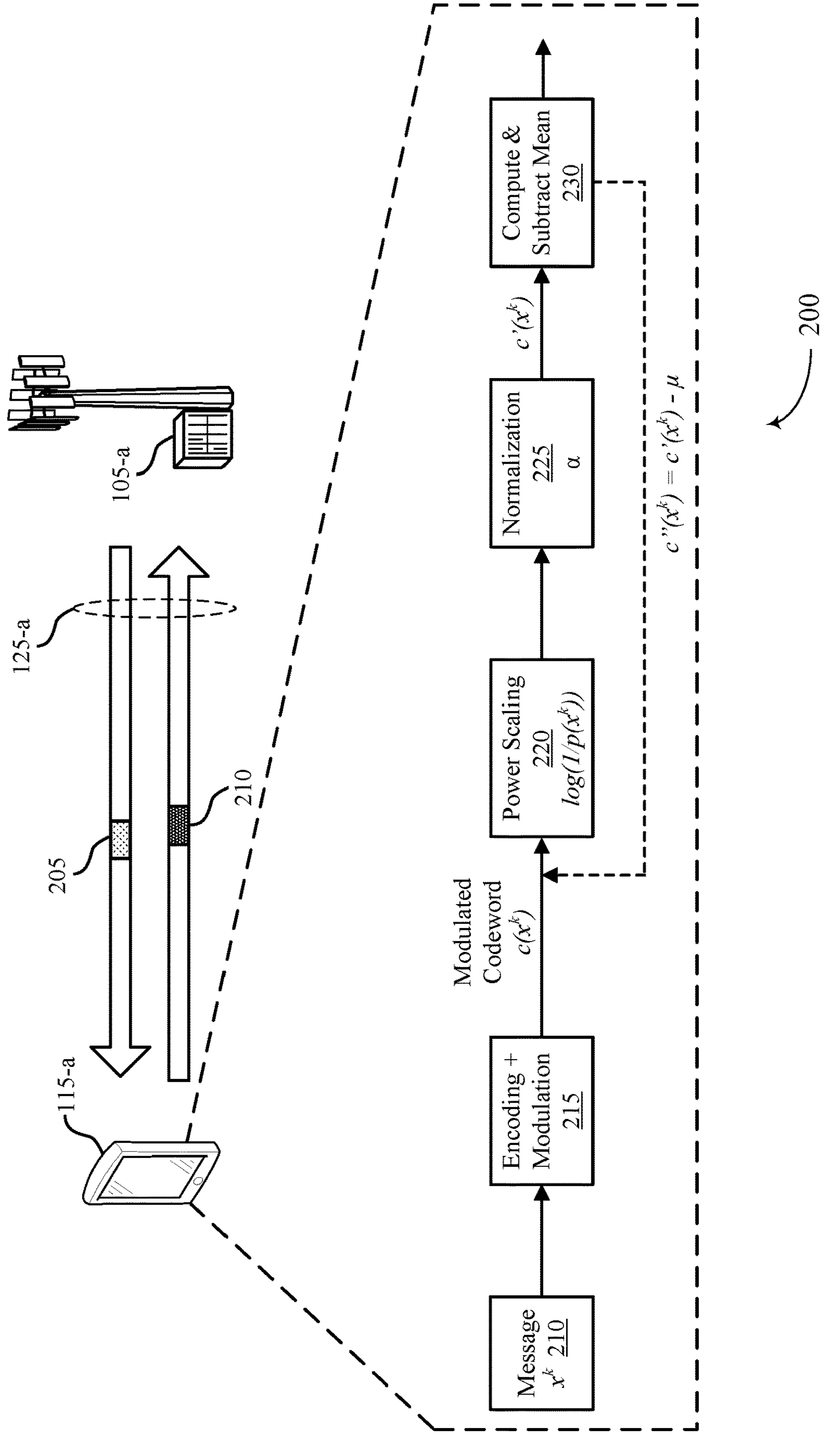
FIG. 2 shows an example of a wireless communications system that supports power control for non-uniform message transmissions in accordance with one or more aspects of the present disclosure.

FIG. 2 shows an example of a wireless communications system 200 that supports power control for non-uniform message transmissions in accordance with one or more aspects of the present disclosure. The wireless communications system 200 may implement aspects of or may be implemented by aspects of the wireless communications system 100. For example, the wireless communications system 200 includes a UE 115-*a*, which may be an example of a UE 115 as described herein. The wireless communications system 200 may also include a network entity 105-*a*, which may be an example of a network entity 105 as described herein.

The UE 115-*a* may communicate with the network entity 105-*a* using a communication link 125-*a*. The communication link 125-*a* may be an example of an NR or LTE link between the UE 115-*a* and the network entity 105-*a*. The communication link 125-*a* may include bi-directional links that enable both uplink and downlink communications. For example, the network entity 105-*a* may transmit downlink signals (e.g., downlink transmissions), such as downlink messages 205 including downlink control signaling and downlink data signals, to the UE 115-*a* using the communication link 125-*a*, and the UE 115-*a* may transmit uplink messages 210 (e.g., uplink transmissions), including uplink control signaling and uplink data signals to the network entity 105-*a* using the communication link 125-*a*.

In some examples, the UE 115-*a* may receive the downlink messages 205 from the network entity 105-*a*, and the UE 115-*a* may transmit messages 210 providing feedback for the downlink messages. For example, the UE 115-*a* may transmit a feedback codebook, such as a HARQ ACK or NACK codebook including feedback bits indicating ACK and/or NACK information for the received downlink messages (e.g., PDSCH transmissions). In some examples, the UE 115-*a* may be more likely to transmit the ACK (e.g., bit 0) than the NACK (e.g., bit 1). For example, the network entity 105-*a* may schedule five message on the PDSCH, and the UE 115-*a* may transmit a five bit message for HARQ ACK/NACK based on the decoding of the PDSCH transmissions. At a 10% BLER in PDSCH, the UE 115-*a* may transmit 90% ACK and 10% NACK or ACK (e.g., bit 0) with a 90% probability and NACK (e.g., bit 1) with a 10% probability. However, current codebooks are designed for uniform probability of messages with equal likelihood of the bit 0 and bit 1, and power is applied uniformly to the non-uniform message. Techniques for power control for non-uniform message transmissions may improve power savings. More power may be proportionally assigned to less likely symbols and less power to more likely symbols to save average transmit power and improve error performance.

In some examples, techniques for power control for non-uniform message transmissions may provide variable transmission power. For example, the power for each codeword may be scaled with respect to a Shannon coding length of the corresponding message. Referring to FIG. 2, the UE 115-*a* may encode and modulate 215 the message 210 (e.g., $x^k$) to obtain a codeword $c(x^k)$. In some cases, the modulation process may be binary-phase-shift keying (BPSK) per in-phase and quadrature components (I/Q) or may use one or more other modulation schemes. The UE 115-*a* may perform a power scaling procedure 220 for the codeword $c(x^k)$ based on a power scaling parameter. In some cases, the UE 115-*a* may receive the power scaling parameter from the network entity 105-*a*. In some examples, the power scaling parameter may be associated with a non-uniform probability of respective portions of the message $x^k$. For example, the power scaling procedure may use a scaling parameter of $$\log\left(\frac{1}{p(x^k)}\right)$$

where $p(x^k)$ is the non-uniform probability of the message $x^k$.

After the power scaling, the UE 115-*a* may apply normalization 225. In some cases, the UE 115-*a* may apply a normalization parameter α. The normalization parameter α may have unit expected power across codebook. In some cases, the scaling parameter of $$\log\left(\frac{1}{p(x^k)}\right)$$

may be connected to a Maxwell-Bolzmann distribution for probabilistic shaping $\log p(x) \sim |x|^2$. In some examples, the UE 115-*a* may transmit codeword based at least in part on the power scaling procedure 220 and the normalization 225.

In some examples, techniques for power control for ACK/NACK transmission may scale power according to the probability of message sequence. For example, if the message sequence $x^k$ has probability $p(x^k)$, then the power of the corresponding codeword transmission $c(x^k)$ may be scaled with $$\log\left(\frac{1}{p(x^k)}\right).$$

After normalization with respect to unit expected power over the whole codebook, message sequence $x^k$ may be mapped to $$\log\left(\frac{1}{p(x^k)}\right)*\frac{1}{\sum_{x^k} p(x^k)\log\left(\frac{1}{p(x^k)}\right)}*c(x^k),$$

where the normalization parameter α is $$\frac{1}{\sum_{x^k} p(x^k)\log\left(\frac{1}{p(x^k)}\right)}.$$

Techniques for power control for the message comprising independent and identically distributed bit values may scale power according to the probability of message sequence. If all bits are independent and identically Bernoulli distributed (Bern(p)), the probability may be $p(x^k)=p^m(1-p)^{k-m}$, where p denotes a probability of bit 1, m denotes a quantity of bit 1 in the message $x^k$, and k denotes the message length. In some cases, the normalization parameter may be simplified to $$\alpha=\sum_{x^k} p(x^k)\log\left(\frac{1}{p(x^k)}\right)=\frac{1}{kH(p)},$$

where $H(p)=-p\log(p)-(1-p)\log(1-p)$ is the entropy of Bern(p) variable and may be precomputed for a given value of p. The power scaling may be simplified to $$\alpha*\log\left(\frac{1}{p(x^k)}\right)=\frac{1}{k*H(p)}\log\left(\frac{1}{p(x^k)}\right).$$

In some examples, techniques for power control for the message comprising bits having non-identically distributed bit values may scale power according to the probability of message sequence. In some cases, the bits may correspond to different types of contents. For example, a subset of message bits may correspond to HARQ-ACK and another subset may correspond to a scheduling request (SR).

There may be different reliability requirements for the ACK/NACK transmissions. For example, enhanced mobile broadband (eMBB) may have a prior probability of 0.9 for ACK and 0.1 for NACK, and ultra reliable low latency communications (URLLC) may have a prior probability of 0.99 for ACK and 0.01 for NACK. If ACKs/NACKs are assumed to be independent and identically distributed within each subset of messages and the subsets are independent from each other, then simplifications may be made for the normalization parameter. For example, Bern $(p_1)$ $(p_1=0.1)$ prior length-k1 message followed by Bern $(p_2)$ $(p_2=0.01)$ prior length-k2 message, then $$p(x^{k_1+k_2})=p_1^{m_1}(1-p_1)^{k_1-m_1}*p_2^{m_2}(1-p_2)^{k_2-m_2},$$

where $m_i$ is the quantity of 1's (e.g., the quantity of respective bits set to a value of '1') in the $i^{th}$ subset of message, and i=1, 2, and $$\alpha=\sum_{x^{k_1+k_2}} p(x^{k_1+k_2})\log\left(\frac{1}{p(x^{k_1+k_2})}\right)=\frac{1}{k_1+k_2}*\frac{1}{H(p_1)+H(p_2)}.$$

In some cases, a cyclic redundancy check (CRC) may be inserted after a payload for the message. The CRC may have a uniform prior probability which may be different from the prior probability of the payload, and simplifications within the subset of messages may be made for the normalization parameter using the general definition to compute the scalar. For example, for probability of 0.1 for NACK and probability of 0.9 for ACK, and a prior length k1 message combined with length k2 CRC, then $p(x^{k_1+k_2})=p^{m_1}(1-p)^{k_1-m_1}*0.5^{k_2}$, where p is the prior probability for bit 1, $m_i$ is the quantity of bit 1 in the first subset of messages, and the normalization parameter may be $$\alpha=\frac{1}{k_1+k_2}*\frac{1}{H(p_1)+1}.$$

Alternatively, the power scaling may be use on the payload portion of the message not including CRC portion.

As described herein, the network entity 105-*a* may indicate the power control parameters, such as prior probability (e.g., p or $p_1$, $p_2$ for bits with different priors). The UE 115-*a* may be configured in a RRC message or indicated via downlink control information (DCI) or a MAC control element (CE). For example, the UE 115-*a* may receive control signaling (e.g., downlink message 205) indicating the power control parameter that is associated with a non-uniform probability of a message.

In some examples, techniques for variable power transmission may including clipping. In some cases, a very unlikely message sequence (e.g., all NACKs) may be mapped to a very large power. To improve peak to average power ratio (PAPR), the power may be clipped at a power threshold (T) prior to normalization, and the power associated with the codeword may be limited based on the power threshold (T). For example, the power scaling may be $$\min\left\{\log\left(\frac{1}{p(x^k)}\right), T\right\}.$$

In some examples, the network entity 105-*a* may indicate the power threshold (T) to the UE 115-*a*. For example, the UE 115-*a* may be configured in a RRC message or indicated by DCI or MAC CE. For example, the UE 115-*a* may receive control signaling (e.g., downlink message 205) indicating the power threshold. In some examples, the UE 115-*a* may indicate the power threshold or the clipping value to the network entity 105-*a*. For example, the network entity 105-*a* may be configured in a RRC message or indicated by uplink control information. For example, the UE 115-*a* may transmit a signal (e.g., uplink message 210) indicating the power threshold.

The described techniques for power control for non-uniform message transmission may be generalized to higher order modulation. To provide the variable transmission power for the non-uniform message, the normalization may be applied per symbol or the normalization may be applied over the whole block length $$\left(\text{e.g., } i = 1, 2, \ldots, \frac{n}{\log_2 M}\right.$$

for codebook size ($2^k$×n) and modulation order M). For normalization per symbol, the modulated codework may be denoted $c(x^k)=[c_1\ c_2\ \ldots\ c_{n'}]$, where $$n' = \frac{n}{\log_2 M}$$

and the normalization parameter may depend on a transmission time (t) as $$\alpha_t = \frac{1}{\sum_{x^k} p(x^k)\log\left(\frac{1}{p(x^k)}\right)|c_t(x^k)|^2}$$

where t∈{1, 2, . . . , n'}. For normalization applied over the whole block length, the modulated codework may be denoted $c(x^k)=[c_1\ c_2\ \ldots\ c_{n'}]$, where $$n' = \frac{n}{\log_2 M}$$

and the normalization parameter may be $$\alpha_t = \frac{1}{\sum_{x^k} p(x^k)\log\left(\frac{1}{p(x^k)}\right)\frac{1}{n'}\sum_{t=1}^{n'}|c_t(x^k)|^2}.$$

In some examples, if the transmitted symbol has a non-zero mean, then the power may be wasted, so the techniques for power control for non-uniform message transmission may transmit zero mean constellation. In some cases, the power scaling may not provide zero mean transmission. In some examples, the UE 115-*a* may iterate between power scaling and mean cancellation. For example, the UE 115-*a* may perform a compute and subtract mean 230 after the normalization 225. In some cases, the UE 115-*a* may compute a mean (μ) of an amplitude associated with a transmitted signal and may subtract the mean from the normalized codeword as $c''(x^k)=c'(x^k)-\mu$. The mean may be computed per symbol as $\mu_t=\Sigma_{x^k}p(x^k)c_t(x^k)$ or over the whole block length as $$\mu = \sum_{x^k} p(x^k)\frac{1}{n'}\sum_{t=1}^{n'} c_t(x^k).$$

Figure 3:
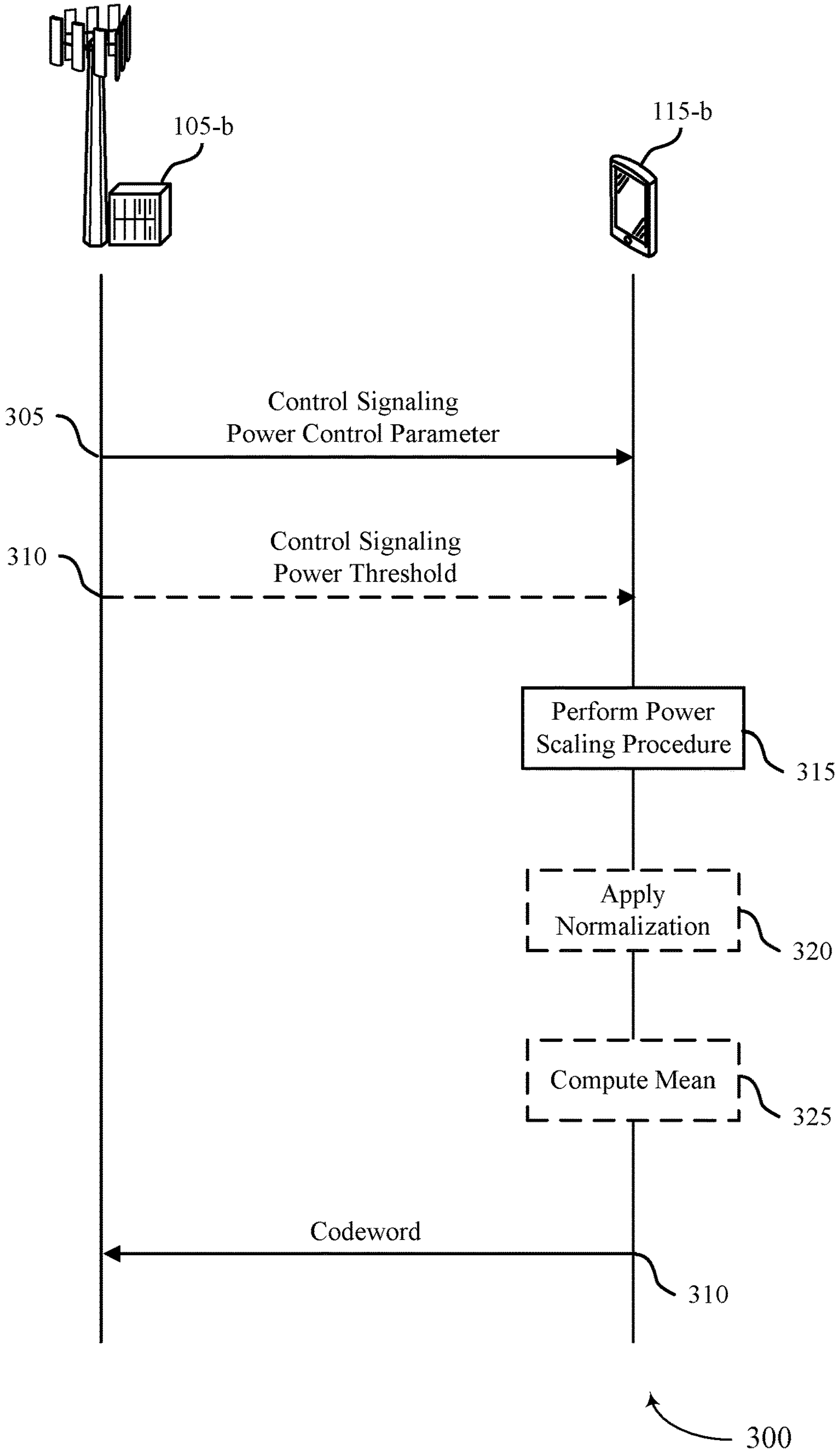
FIG. 3 shows an example of a process flow that supports power control for non-uniform message transmissions in accordance with one or more aspects of the present disclosure.

FIG. 3 shows an example of a process flow 300 that supports power control for non-uniform message transmissions in accordance with one or more aspects of the present disclosure. In some examples, the process flow 300 may implement or be implemented by aspects of the wireless communications systems 100 and 200 as described with reference to FIGS. 1 and 2, respectively. For example, the process flow 300 may be implemented by a network entity 105-*b*, which may be an example of the network entities 105 as described with reference to FIGS. 1 and 2. The process flow 300 may be implemented by a UE 115-*b*, which may be an example of the UEs as described with reference to FIGS. 1 and 2.

In some examples, the operations illustrated in process flow 300 may be performed by hardware (e.g., including circuitry, processing blocks, logic components, and other components), code (e.g., software executed by a processor), or any combination thereof. Alternative examples of the following may be implemented, where some steps are performed in a different order than described or are not performed at all. In some cases, steps may include additional features not mentioned below, or further steps may be added.

At 305, the UE 115-*b* may receive a first control signal indicating a power control parameter that is associated with a non-uniform probability of a message. The non-uniform probability may be associated with a probability of one or more bit values included in the message. In some examples, the message may include a sequence of one or more HARQ ACK bit values or one or more HARQ NACK bit values, and the power control parameter may be associated with the non-uniform probability of the message comprising the one or more HARQ ACK bit values or the one or more HARQ NACK bit values.

At 310, the UE 115-*b* may receive a second control signal indicating a power threshold. In some examples, the UE 115-*b* may determine the power threshold based at least in part on the one or more bit values included in the message, and the UE 115-*b* may transmit a signal indicating the power threshold to the network entity 105-*b*.

At 315, the UE 115-*b* may perform a power scaling procedure for a codeword based at least in part on the power control parameter. The codeword may comprise the message. In some examples, the UE 115-*b* may perform the power scaling procedure for the codeword based at least in part on the power threshold, and a power associated with the codeword may be limited based at least in part on the power threshold. In some examples, the power scaling procedure may be based at least in part on one or more capabilities of the UE. In some examples, the power scaling procedure may be based at least in part on a scaling parameter of log(1/p(x)), where p(x) is the probability of the one or more bit values included in the message.

At 320, the UE 115-*b* may apply normalization to the codeword after the power scaling procedure. The normalization may be based at least in part on a power value associated with a codebook. In some examples, the normalization may be based at least in part on a normalization parameter. In some examples, the normalization parameter may be associated with an entropy of a distribution of the one or more bit values included in the message, and the power control parameter may be associated with the non-uniform probability of the message comprising independent and identically distributed bit values. In some examples, the normalization may be associated with an entropy of a distribution of the one or more bit values included in the message, and the power control parameter may be associated with the non-uniform probability of the message comprising non-identically distributed bit values. In some examples, the one or more values may correspond to one or more types of content of the message. In some examples, the non-uniform probability corresponds to one or more reliability parameters for the message. In some examples, the bit values associated with a first portion of the message may have a non-uniform probability and the bit values associated with a second portion of the message may have a uniform probability. In some examples, the normalization may be applied to each symbol associated with the codeword or to a block length associated with the codeword.

At 325, the UE 115-*b* may compute a mean of an amplitude associated with a transmitted signal. In some examples, the mean may be computed for each symbol associated with the codeword or over a block length associated with the codeword.

At 330, the UE 115-*b* may transmit the codeword based at least in part on the power scaling procedure. In some examples, the UE 115-*b* may transmit the codeword based at least in part on the normalization. In some examples, the UE 115-*b* may transmit the codeword based at least in part on the normalization and the mean.

Figure 4:
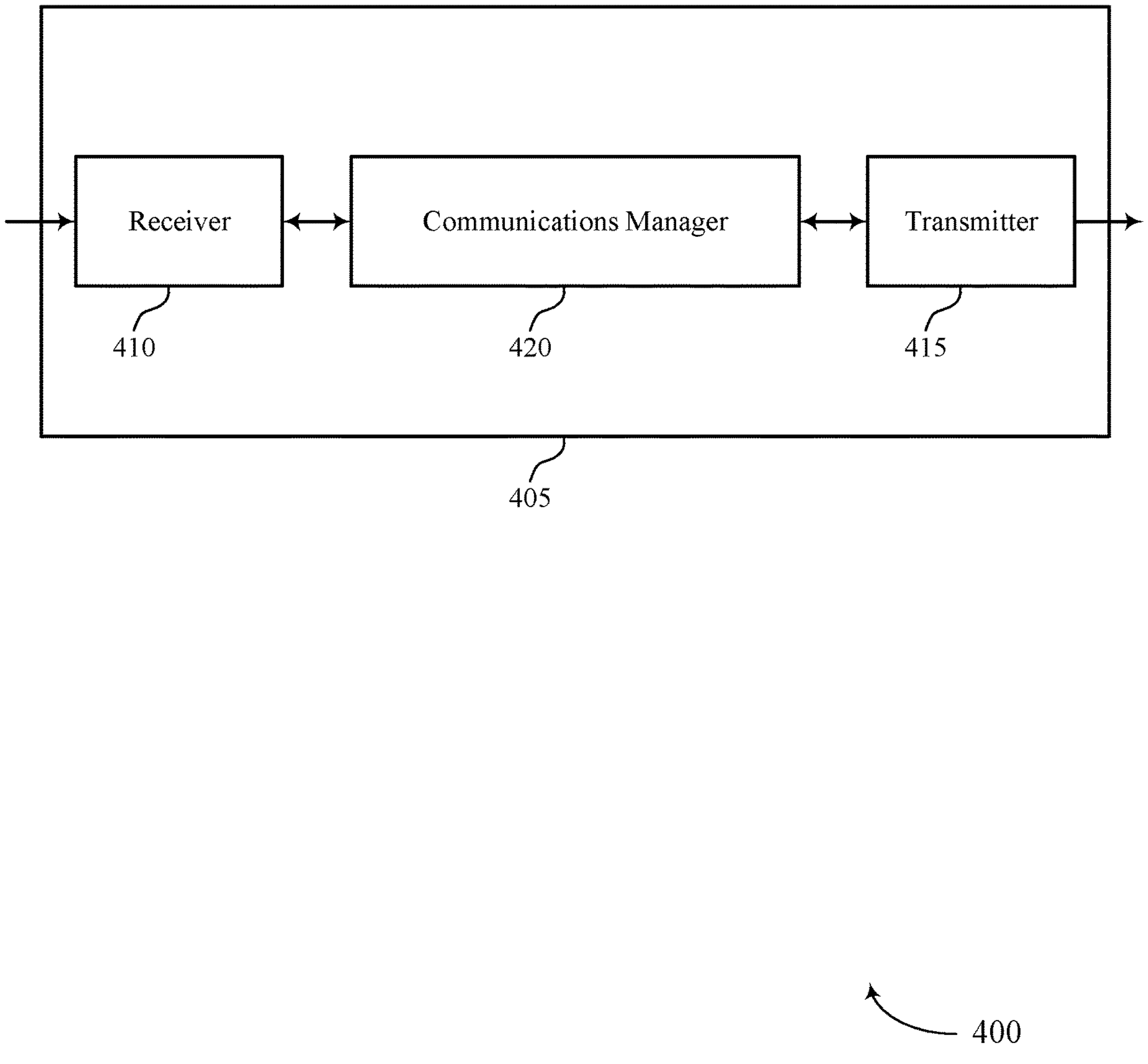
FIGS. 4 and 5 show block diagrams of devices that support power control for non-uniform message transmissions in accordance with one or more aspects of the present disclosure.

FIG. 4 shows a block diagram 400 of a device 405 that supports power control for non-uniform message transmissions in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to power control for non-uniform message transmission). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to power control for non-uniform message transmission). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of power control for non-uniform message transmissions as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving a first control signal indicating a power control parameter that is associated with a non-uniform probability of a message, where the non-uniform probability is associated with a probability of one or more bit values included in the message. The communications manager 420 is capable of, configured to, or operable to support a means for performing a power scaling procedure for a codeword based on the power control parameter, where the codeword includes the message. The communications manager 420 is capable of, configured to, or operable to support a means for transmitting the codeword based on the power scaling procedure.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced power consumption and more efficient utilization of communication resources.

Figure 5:
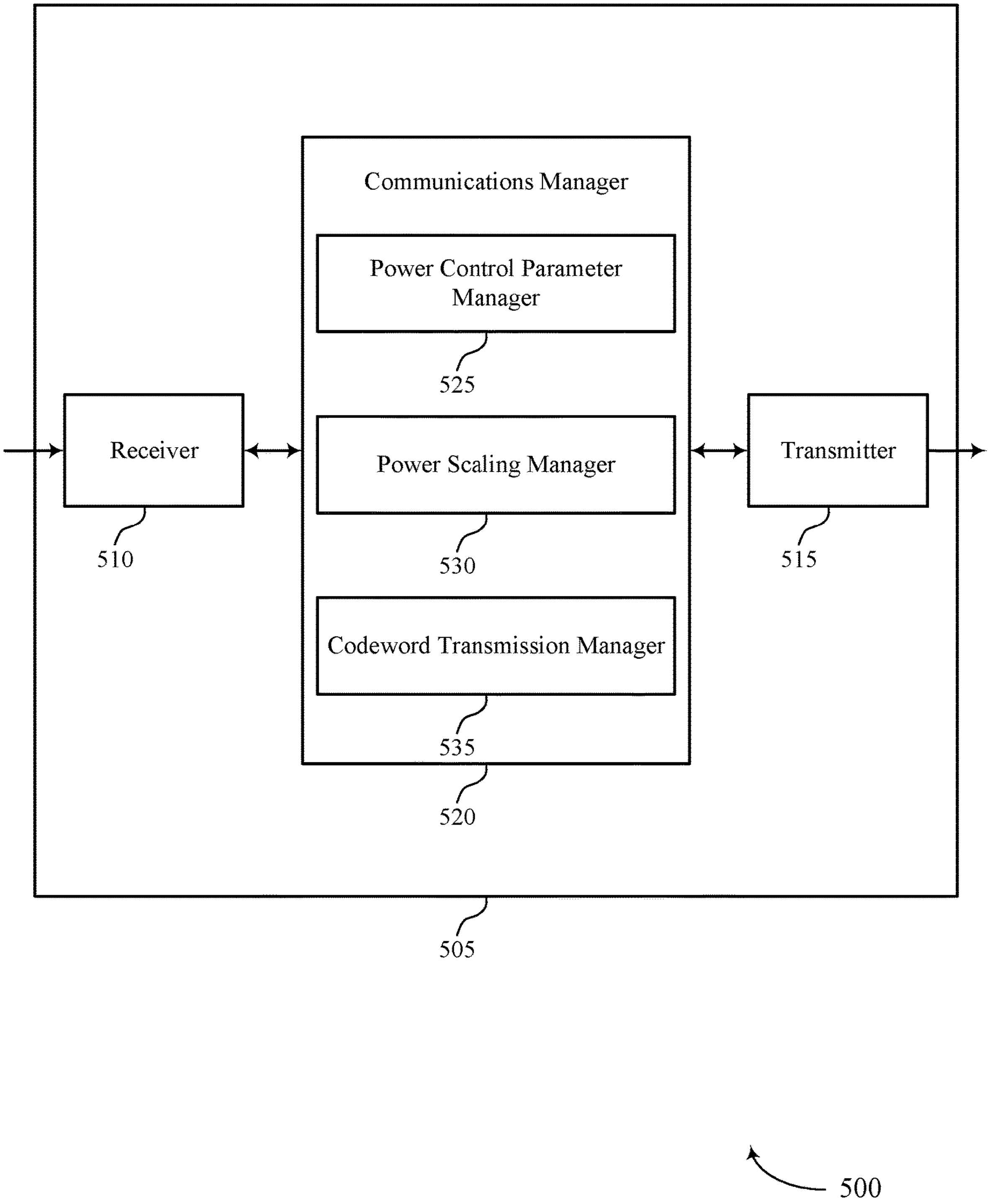

FIG. 5 shows a block diagram 500 of a device 505 that supports power control for non-uniform message transmissions in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to power control for non-uniform message transmission). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power control for non-uniform message transmission). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of power control for non-uniform message transmissions as described herein. For example, the communications manager 520 may include a power control parameter manager 525, a power scaling manager 530, a codeword transmission manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The power control parameter manager 525 is capable of, configured to, or operable to support a means for receiving a first control signal indicating a power control parameter that is associated with a non-uniform probability of a message, where the non-uniform probability is associated with a probability of one or more bit values included in the message. The power scaling manager 530 is capable of, configured to, or operable to support a means for performing a power scaling procedure for a codeword based on the power control parameter, where the codeword includes the message. The codeword transmission manager 535 is capable of, configured to, or operable to support a means for transmitting the codeword based on the power scaling procedure.

Figure 6:
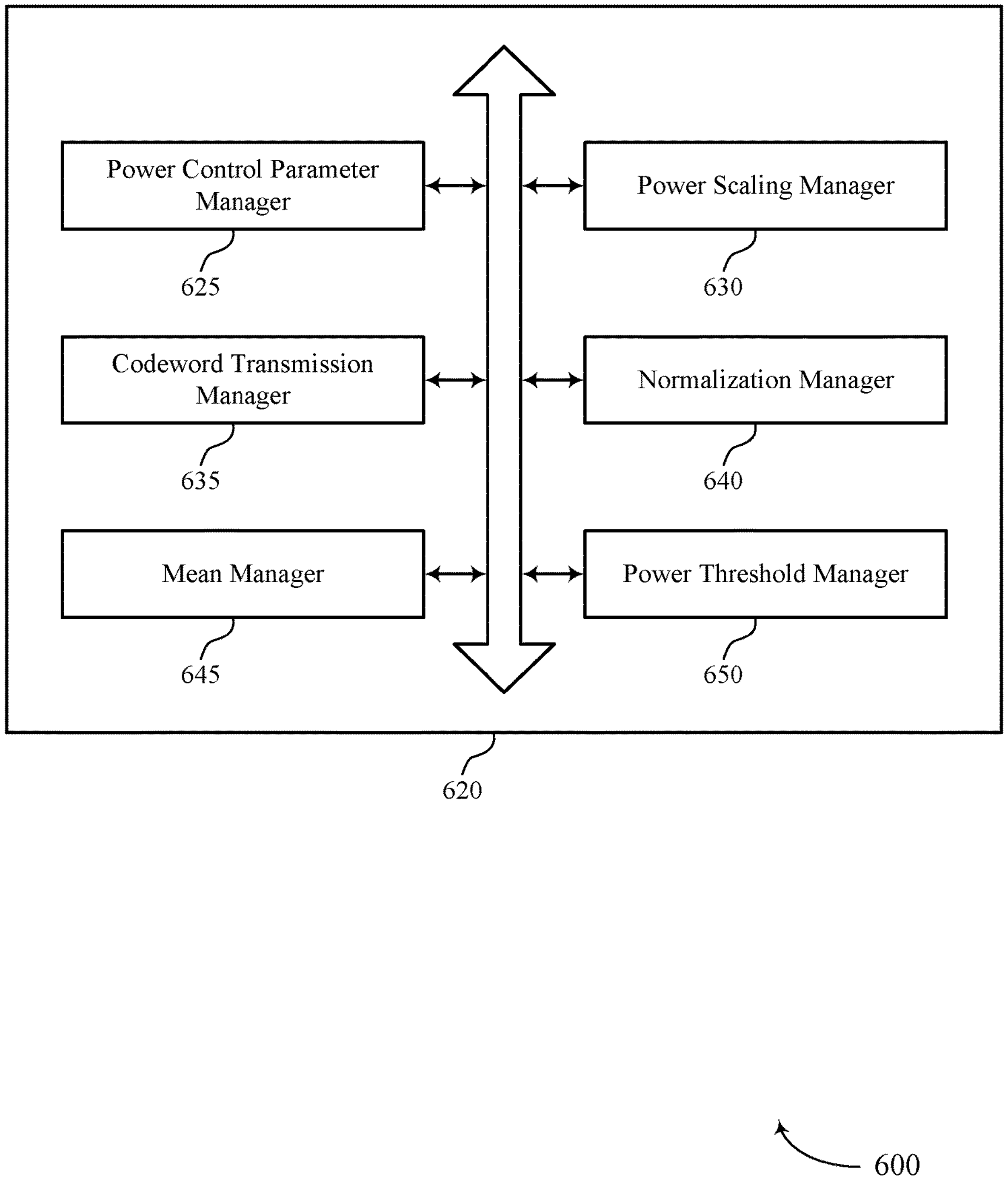
FIG. 6 shows a block diagram of a communications manager that supports power control for non-uniform message transmissions in accordance with one or more aspects of the present disclosure.

FIG. 6 shows a block diagram 600 of a communications manager 620 that supports power control for non-uniform message transmissions in accordance with one or more aspects of the present disclosure. The communications manager 620 may be an example of aspects of a communications manager 420, a communications manager 520, or both, as described herein. The communications manager 620, or various components thereof, may be an example of means for performing various aspects of power control for non-uniform message transmission as described herein. For example, the communications manager 620 may include a power control parameter manager 625, a power scaling manager 630, a codeword transmission manager 635, a normalization manager 640, a mean manager 645, a power threshold manager 650, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The power control parameter manager 625 is capable of, configured to, or operable to support a means for receiving a first control signal indicating a power control parameter that is associated with a non-uniform probability of a message, where the non-uniform probability is associated with a probability of one or more bit values included in the message. The power scaling manager 630 is capable of, configured to, or operable to support a means for performing a power scaling procedure for a codeword based on the power control parameter, where the codeword includes the message. The codeword transmission manager 635 is capable of, configured to, or operable to support a means for transmitting the codeword based on the power scaling procedure.

In some examples, to support transmitting the codeword, the normalization manager 640 is capable of, configured to, or operable to support a means for applying normalization to the codeword after the power scaling procedure, where the normalization is based on a power value associated with a codebook. In some examples, to support transmitting the codeword, the codeword transmission manager 635 is capable of, configured to, or operable to support a means for transmitting the codeword based on the normalization.

In some examples, the normalization is applied to each symbol associated with the codeword or to a block length associated with the codeword.

In some examples, to support performing the power scaling procedure for the codeword, the power scaling manager 630 is capable of, configured to, or operable to support a means for performing the power scaling procedure for the codeword based on a power threshold, where a power associated with the codeword is limited based on the power threshold.

In some examples, the power threshold manager 650 is capable of, configured to, or operable to support a means for receiving a second control signal indicating the power threshold.

In some examples, the power threshold manager 650 is capable of, configured to, or operable to support a means for determining the power threshold based on the one or more bit values included in the message. In some examples, the power threshold manager 650 is capable of, configured to, or operable to support a means for transmitting a signal indicating the power threshold.

In some examples, the message includes a sequence of one or more hybrid-automatic repeat request (HARQ) acknowledgment (ACK) bit values or one or more HARQ negative acknowledgment (NACK) bit values. In some examples, the power control parameter is associated with the non-uniform probability of the message including the one or more HARQ ACK bit values or the one or more HARQ NACK bit values.

In some examples, to support transmitting the codeword, the normalization manager 640 is capable of, configured to, or operable to support a means for applying, after the power scaling procedure, normalization to the codeword, where the normalization is based on a normalization parameter, where the normalization parameter is associated with an entropy of a distribution of the one or more bit values included in the message, where the power control parameter is associated with the non-uniform probability of the message including independent and identically distributed bit values. In some examples, to support transmitting the codeword, the codeword transmission manager 635 is capable of, configured to, or operable to support a means for transmitting the codeword based on the normalization.

In some examples, to support transmitting the codeword, the normalization manager 640 is capable of, configured to, or operable to support a means for applying, after the power scaling procedure, normalization to the codeword, where the normalization is based on a normalization parameter, where the normalization parameter is associated with an entropy of a distribution of the one or more bit values included in the message, where the power control parameter is associated with the non-uniform probability of the message including non-identically distributed bit values.

In some examples, the one or more bit values correspond to one or more types of content of the message.

In some examples, the non-uniform probability corresponds to one or more reliability parameters for the message.

In some examples, bit values associated with a first portion of the message have a non-uniform probability and bit values associated with a second portion of the message have a uniform probability.

In some examples, the power scaling procedure is based on one or more capabilities of the UE.

In some examples, to support transmitting the codeword, the normalization manager 640 is capable of, configured to, or operable to support a means for applying normalization to the codeword after the power scaling procedure, where the normalization is based on a power value associated with a codebook. In some examples, to support transmitting the codeword, the mean manager 645 is capable of, configured to, or operable to support a means for computing a mean of an amplitude associated with a transmitted signal. In some examples, to support transmitting the codeword, the codeword transmission manager 635 is capable of, configured to, or operable to support a means for transmitting the codeword based on the normalization and the mean.

In some examples, the mean is computed for each symbol associated with the codeword or over a block length associated with the codeword.

In some examples, the power scaling procedure is based on a scaling parameter of $\log(1/p(x))$, where $p(x)$ is the probability of the one or more bit values included in the message.

Figure 7:
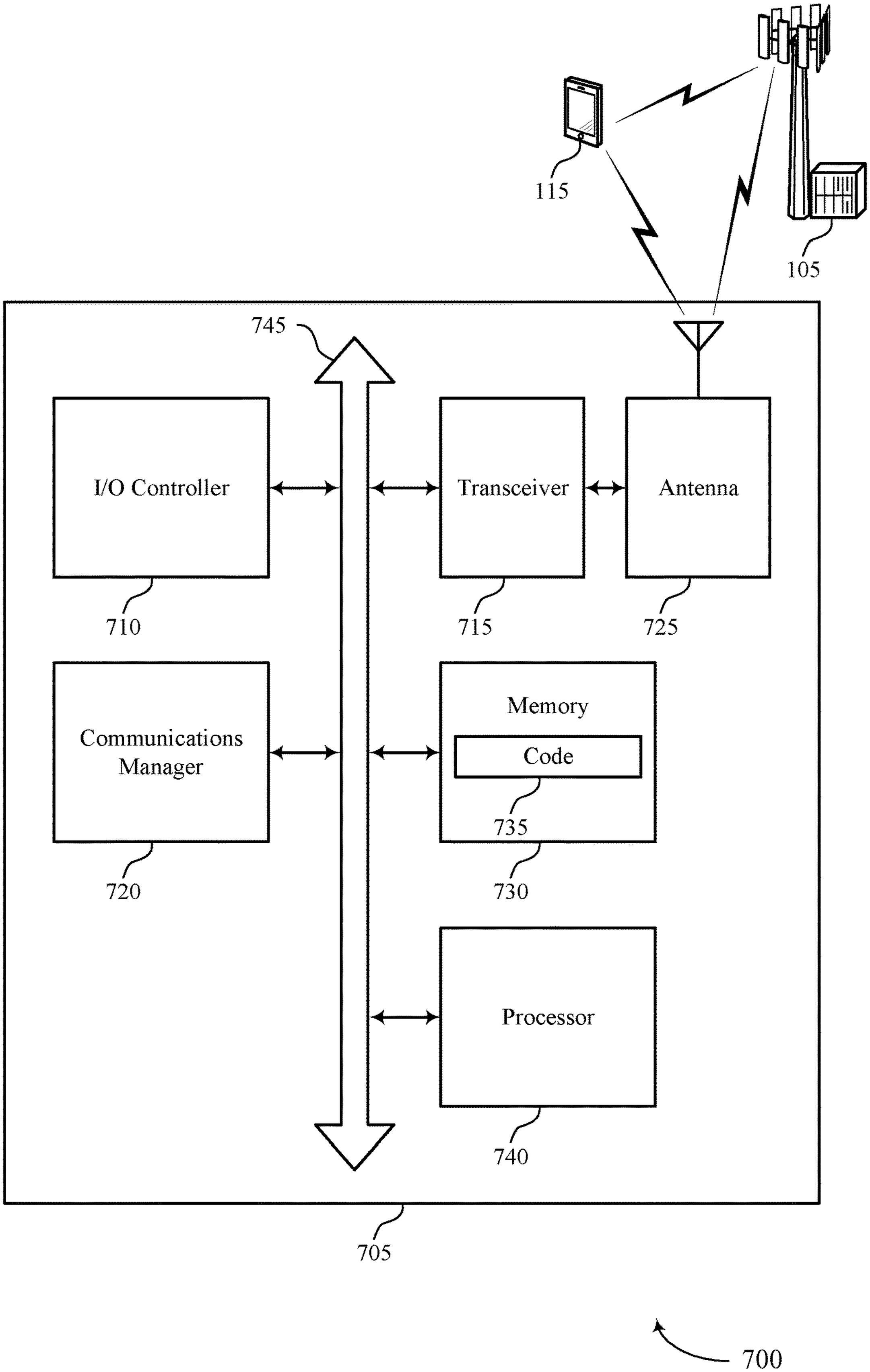
FIG. 7 shows a diagram of a system including a device that supports power control for non-uniform message transmissions in accordance with one or more aspects of the present disclosure.

FIG. 7 shows a diagram of a system 700 including a device 705 that supports power control for non-uniform message transmission in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting power control for non-uniform message transmissions). For example, the device 705 or a component of the device 705 may include at least one processor 740 and at least one memory 730 coupled with or to the at least one processor 740, the at least one processor 740 and the at least one memory 730 configured to perform various functions described herein.

In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving a first control signal indicating a power control parameter that is associated with a non-uniform probability of a message, where the non-uniform probability is associated with a probability of one or more bit values included in the message. The communications manager 720 is capable of, configured to, or operable to support a means for performing a power scaling procedure for a codeword based on the power control parameter, where the codeword includes the message. The communications manager 720 is capable of, configured to, or operable to support a means for transmitting the codeword based on the power scaling procedure.

By including or configuring the communications manager 720 in accordance with examples as described herein, the device 705 may support techniques for improved communication reliability, reduced power consumption, more efficient utilization of communication resources, improved coordination between devices, and longer battery life.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of power control for non-uniform message transmissions as described herein, or the at least one processor 740 and the at least one memory 730 may be otherwise configured to, individually or collectively, perform or support such operations.

Figure 8:
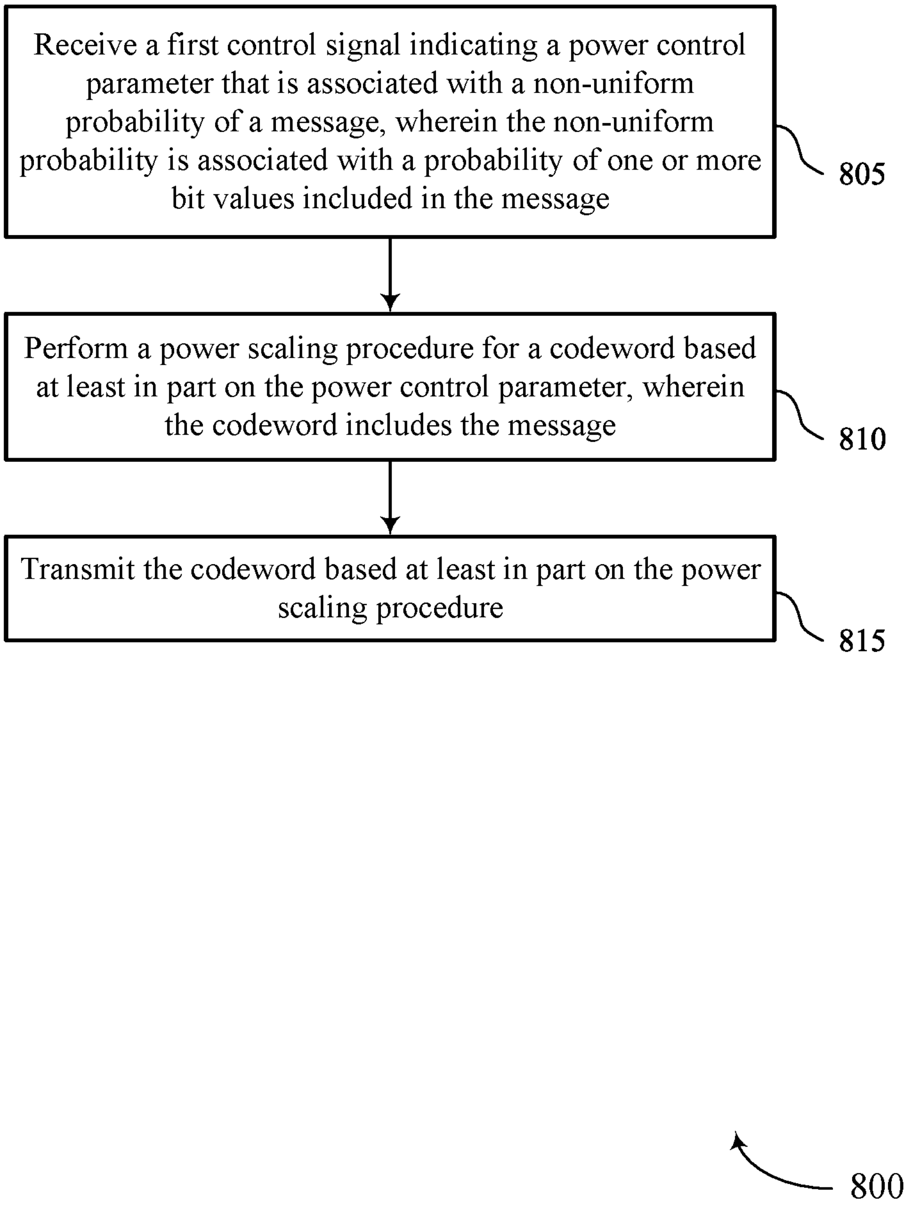
FIGS. 8 and 9 show flowcharts illustrating methods that support power control for non-uniform message transmissions in accordance with one or more aspects of the present disclosure.

FIG. 8 shows a flowchart illustrating a method 800 that supports power control for non-uniform message transmissions in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include receiving a first control signal indicating a power control parameter that is associated with a non-uniform probability of a message, wherein the non-uniform probability is associated with a probability of one or more bit values included in the message. The operations of 805 may be performed in accordance with examples as disclosed herein. In some examples, aspects of the operations of 805 may be performed by a power control parameter manager 625 as described with reference to FIG. 6.

At 810, the method may include performing a power scaling procedure for a codeword based at least in part on the power control parameter, wherein the codeword includes the message. The operations of 810 may be performed in accordance with examples as disclosed herein. In some examples, aspects of the operations of 810 may be performed by a power scaling manager 630 as described with reference to FIG. 6.

At 815, the method may include transmitting the codeword based at least in part on the power scaling procedure. The operations of 815 may be performed in accordance with examples as disclosed herein. In some examples, aspects of the operations of 815 may be performed by a codeword transmission manager 635 as described with reference to FIG. 6.

Figure 9:
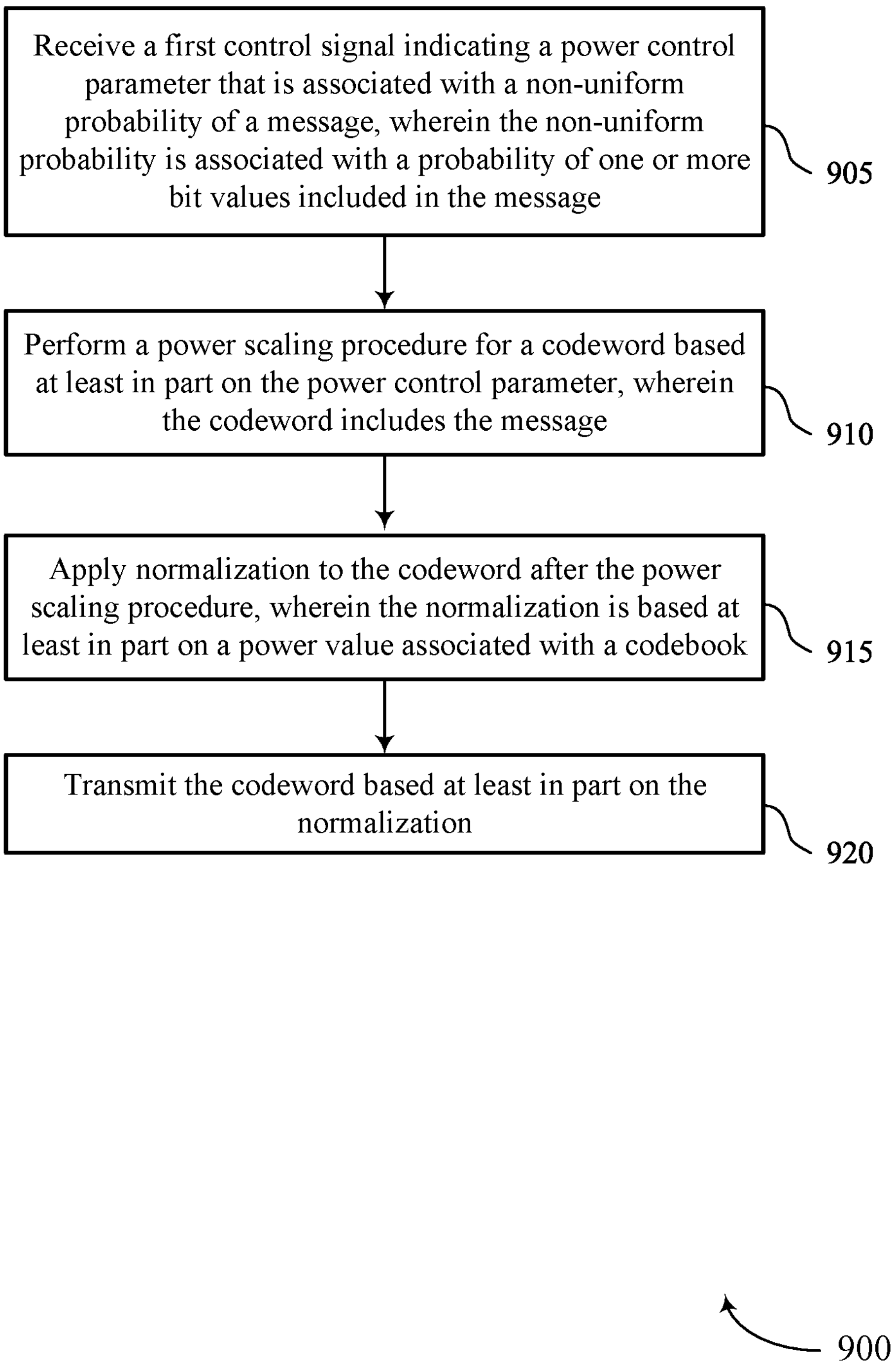

FIG. 9 shows a flowchart illustrating a method 900 that supports power control for non-uniform message transmissions in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include receiving a first control signal indicating a power control parameter that is associated with a non-uniform probability of a message, wherein the non-uniform probability is associated with a probability of one or more bit values included in the message. The operations of 905 may be performed in accordance with examples as disclosed herein. In some examples, aspects of the operations of 905 may be performed by a power control parameter manager 625 as described with reference to FIG. 6.

At 910, the method may include performing a power scaling procedure for a codeword based at least in part on the power control parameter, wherein the codeword includes the message. The operations of 910 may be performed in accordance with examples as disclosed herein. In some examples, aspects of the operations of 910 may be performed by a power scaling manager 630 as described with reference to FIG. 6.

At 915, the method may include applying normalization to the codeword after the power scaling procedure, wherein the normalization is based at least in part on a power value associated with a codebook. The operations of 915 may be performed in accordance with examples as disclosed herein. In some examples, aspects of the operations of 915 may be performed by a normalization manager 640 as described with reference to FIG. 6.

At 920, the method may include transmitting the codeword based at least in part on the normalization. The operations of 920 may be performed in accordance with examples as disclosed herein. In some examples, aspects of the operations of 920 may be performed by a codeword transmission manager 635 as described with reference to FIG. 6.

The following provides an overview of aspects of the present disclosure:

Aspect 1: A method for wireless communications at a UE, comprising: receiving a first control signal indicating a power control parameter that is associated with a non-uniform probability of a message, wherein the non-uniform probability is associated with a probability of one or more bit values included in the message; performing a power scaling procedure for a codeword based at least in part on the power control parameter, wherein the codeword comprises the message; and transmitting the codeword based at least in part on the power scaling procedure.

Aspect 2: The method of aspect 1, wherein transmitting the codeword further comprises: applying normalization to the codeword after the power scaling procedure, wherein the normalization is based at least in part on a power value associated with a codebook; and transmitting the codeword based at least in part on the normalization.

Aspect 3: The method of aspect 2, wherein the normalization is applied to each symbol associated with the codeword or to a block length associated with the codeword.

Aspect 4: The method of any of aspects 1 through 3, wherein performing the power scaling procedure for the codeword comprises: performing the power scaling procedure for the codeword based at least in part on a power threshold, wherein a power associated with the codeword is limited based at least in part on the power threshold.

Aspect 5: The method of aspect 4, further comprising: receiving a second control signal indicating the power threshold.

Aspect 6: The method of any of aspects 4 through 5, further comprising: determining the power threshold based at least in part on the one or more bit values included in the message; and transmitting a signal indicating the power threshold.

Aspect 7: The method of any of aspects 1 through 6, wherein the message comprises a sequence of one or more hybrid-automatic repeat request (HARQ) acknowledgment (ACK) bit values or one or more HARQ negative acknowledgment (NACK) bit values, and the power control parameter is associated with the non-uniform probability of the message comprising the one or more HARQ ACK bit values or the one or more HARQ NACK bit values.

Aspect 8: The method of any of aspects 1 through 7, wherein transmitting the codeword further comprises: applying, after the power scaling procedure, normalization to the codeword, wherein the normalization is based at least in part on a normalization parameter, wherein the normalization parameter is associated with an entropy of a distribution of the one or more bit values included in the message, wherein the power control parameter is associated with the non-uniform probability of the message comprising independent and identically distributed bit values; and transmitting the codeword based at least in part on the normalization.

Aspect 9: The method of any of aspects 1 through 7, wherein transmitting the codeword further comprises: applying, after the power scaling procedure, normalization to the codeword, wherein the normalization is based at least in part on a normalization parameter, wherein the normalization parameter is associated with an entropy of a distribution of the one or more bit values included in the message, wherein the power control parameter is associated with the non-uniform probability of the message comprising non-identically distributed bit values.

Aspect 10: The method of aspect 9, wherein the one or more bit values correspond to one or more types of content of the message.

Aspect 11: The method of any of aspects 9 through 10, wherein the non-uniform probability corresponds to one or more reliability parameters for the message.

Aspect 12: The method of any of aspects 9 through 11, wherein bit values associated with a first portion of the message have a non-uniform probability and bit values associated with a second portion of the message have a uniform probability.

Aspect 13: The method of any of aspects 1 through 12, wherein the power scaling procedure is based at least in part on one or more capabilities of the UE.

Aspect 14: The method of any of aspects 1 through 13, wherein transmitting the codeword further comprises: applying normalization to the codeword after the power scaling procedure, wherein the normalization is based at least in part on a power value associated with a codebook; computing a mean of an amplitude associated with a transmitted signal; and transmitting the codeword based at least in part on the normalization and the mean.

Aspect 15: The method of aspect 14, wherein the mean is computed for each symbol associated with the codeword or over a block length associated with the codeword.

Aspect 16: The method of any of aspects 1 through 15, wherein the power scaling procedure is based at least in part on a scaling parameter of $\log(1/p(x))$, where $p(x)$ is the probability of the one or more bit values included in the message.

Aspect 17: A UE for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the UE to perform a method of any of aspects 1 through 16.

Aspect 18: A UE for wireless communications, comprising at least one means for performing a method of any of aspects 1 through 16.

Aspect 19: A non-transitory computer-readable medium storing code for wireless communications, the code comprising instructions executable by one or more processors (e.g., directly, indirectly, after pre-processing, without pre-processing) to perform a method of any of aspects 1 through 16.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an NPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a first control signal indicating a power control parameter that is associated with a non-uniform probability of a message, wherein the non-uniform probability is associated with a probability of one or more bit values included in the message;

perform a power scaling procedure for a codeword based at least in part on the power control parameter, wherein the codeword comprises the message; and transmit the codeword based at least in part on the power scaling procedure.

2. The UE of claim 1, wherein, to transmit the codeword, the one or more processors are individually or collectively further operable to execute the code to cause the UE to:

apply normalization to the codeword after the power scaling procedure, wherein the normalization is based at least in part on a power value associated with a codebook; and transmit the codeword based at least in part on the normalization.

3. The UE of claim 2, wherein the normalization is applied to each symbol associated with the codeword or to a block length associated with the codeword.

4. The UE of claim 1, wherein, to perform the power scaling procedure for the codeword, the one or more processors are individually or collectively operable to execute the code to cause the UE to:

perform the power scaling procedure for the codeword based at least in part on a power threshold, wherein a power associated with the codeword is limited based at least in part on the power threshold.

5. The UE of claim 4, wherein the one or more processors are individually or collectively further operable to execute the code to cause the UE to:

receive a second control signal indicating the power threshold.

6. The UE of claim 4, wherein the one or more processors are individually or collectively further operable to execute the code to cause the UE to:

determine the power threshold based at least in part on the one or more bit values included in the message; and transmit a signal indicating the power threshold.

7. The UE of claim 1, wherein:

the message comprises a sequence of one or more hybrid-automatic repeat request (HARQ) acknowledgment (ACK) bit values or one or more HARQ negative acknowledgment (NACK) bit values, and the power control parameter is associated with the non-uniform probability of the message comprising the one or more HARQ ACK bit values or the one or more HARQ NACK bit values.

8. The UE of claim 1, wherein, to transmit the codeword, the one or more processors are individually or collectively further operable to execute the code to cause the UE to:

apply, after the power scaling procedure, normalization to the codeword, wherein the normalization is based at least in part on a normalization parameter, wherein the normalization parameter is associated with an entropy of a distribution of the one or more bit values included in the message, wherein the power control parameter is associated with the non-uniform probability of the message comprising independent and identically distributed bit values; and transmit the codeword based at least in part on the normalization.

9. The UE of claim 1, wherein, to transmit the codeword, the one or more processors are individually or collectively further operable to execute the code to cause the UE to:

apply, after the power scaling procedure, normalization to the codeword, wherein the normalization is based at least in part on a normalization parameter, wherein the normalization parameter is associated with an entropy of a distribution of the one or more bit values included in the message, wherein the power control parameter is associated with the non-uniform probability of the message comprising non-identically distributed bit values.

10. The UE of claim 9, wherein the one or more bit values correspond to one or more types of content of the message.

11. The UE of claim 9, wherein the non-uniform probability corresponds to one or more reliability parameters for the message.

12. The UE of claim 9, wherein bit values associated with a first portion of the message have a non-uniform probability and a bit values associated with a second portion of the message have a uniform probability.

13. The UE of claim 1, wherein the power scaling procedure is based at least in part on one or more capabilities of the UE.

14. The UE of claim 1, wherein, to transmit the codeword, the one or more processors are individually or collectively further operable to execute the code to cause the UE to:

apply normalization to the codeword after the power scaling procedure, wherein the normalization is based at least in part on a power value associated with a codebook;

compute a mean of an amplitude associated with a transmitted signal; and transmit the codeword based at least in part on the normalization and the mean.

15. The UE of claim 14, wherein the mean is computed for each symbol associated with the codeword or over a block length associated with the codeword.

16. The UE of claim 1, wherein the power scaling procedure is based at least in part on a scaling parameter of log(1/p(x)), where p(x) is the probability of the one or more bit values included in the message.

17. A method for wireless communications at a user equipment (UE), comprising:

receiving a first control signal indicating a power control parameter that is associated with a non-uniform probability of a message, wherein the non-uniform probability is associated with a probability of one or more bit values included in the message;

performing a power scaling procedure for a codeword based at least in part on the power control parameter, wherein the codeword comprises the message; and transmitting the codeword based at least in part on the power scaling procedure.

18. The method of claim 17, wherein transmitting the codeword further comprises:

applying normalization to the codeword after the power scaling procedure, wherein the normalization is based at least in part on a power value associated with a codebook; and transmitting the codeword based at least in part on the normalization.

19. The method of claim 17, wherein performing the power scaling procedure for the codeword comprises:

performing the power scaling procedure for the codeword based at least in part on a power threshold, wherein a power associated with the codeword is limited based at least in part on the power threshold.

20. A non-transitory computer-readable medium storing code for wireless communications, the code comprising instructions executable by one or more processors to:

receive a first control signal indicating a power control parameter that is associated with a non-uniform probability of a message, wherein the non-uniform probability is associated with a probability of one or more bit values included in the message;

perform a power scaling procedure for a codeword based at least in part on the power control parameter, wherein the codeword comprises the message; and transmit the codeword based at least in part on the power scaling procedure.

* * * * *